US007406948B2

(12) United States Patent
Hirowatari et al.

(10) Patent No.: US 7,406,948 B2
(45) Date of Patent: Aug. 5, 2008

(54) INTERNAL COMBUSTION ENGINE CONTROLLER

(75) Inventors: Seiji Hirowatari, Toyota (JP); Masanao Idogawa, Toyota (JP); Masahiko Teraoka, Toyota (JP); Fumitoshi Sugiyama, Hamamatsu (JP); Dai Takida, Iwata (JP)

(73) Assignees: Toyota Jidosha Kabushiki Kaisha, Toyota (JP); Yamaha Hatsudoki Kabushiki Kaisha, Iwata (JP)

( * ) Notice: Subject to any disclaimer, the term of this patent is extended or adjusted under 35 U.S.C. 154(b) by 202 days.

(21) Appl. No.: 11/486,081

(22) Filed: Jul. 14, 2006

(65) Prior Publication Data

US 2007/0028690 A1 Feb. 8, 2007

(30) Foreign Application Priority Data

Jul. 19, 2005 (JP) ............................ 2005-208234

(51) Int. Cl.
*F02D 29/00* (2006.01)
*G01P 15/09* (2006.01)

(52) U.S. Cl. ....................... 123/480; 477/98; 73/514.34

(58) Field of Classification Search ................. 123/480, 123/352, 350; 477/98, 110, 176; 73/514.34
See application file for complete search history.

(56) References Cited

U.S. PATENT DOCUMENTS 5,261,295 A * 11/1993 Iwanaga et al. ............... 477/98
5,322,150 A * 6/1994 Schmidt-Brucken et al. ..... 477/176
5,383,824 A * 1/1995 Runge et al. ................ 477/110
6,733,299 B2 * 5/2004 Eguchi et al. ............... 477/176

FOREIGN PATENT DOCUMENTS

| | | | | |
|---|---|---|---|---|
| DE | 101 04 372 | C1 | | 8/2002 |
| DE | 10 2004 044 652 | A1 | | 4/2006 |
| EP | 0462 414 | A1 | * | 12/1991 |
| JP | A 05-126237 | | | 5/1993 |
| JP | A 09-068062 | | | 3/1997 |
| JP | A 09-068063 | | | 3/1997 |
| JP | A 2001-074135 | | | 3/2001 |
| JP | 2003-2086 | A | * | 1/2003 |
| WO | WO 99/67521 | A1 | | 12/1999 |
| WO | WO 2005/061875 | A1 | | 7/2005 |

* cited by examiner

*Primary Examiner*—Hieu T Vo
(74) *Attorney, Agent, or Firm*—Oliff & Berridge, PLC

(57) ABSTRACT

An engine ECU executes a program including: the step of outputting a fuel-cut instruction when conditions that an accelerator position PA is not higher than a threshold value and a rate of increase DNE of engine speed NE is not lower than a determination value DNE(0) are satisfied; the step of fully closing throttle opening; and the step of suspending ignition of air-fuel mixture by a spark plug.

28 Claims, 6 Drawing Sheets

INTERNAL COMBUSTION ENGINE CONTROLLER

This nonprovisional application is based on Japanese Patent Application No. 2005-208234 filed with the Japan Patent Office on Jul. 19, 2005, the entire contents of which are hereby incorporated by reference.

BACKGROUND OF THE INVENTION

1. Field of the Invention

The present invention relates to an internal combustion engine controller and, more specifically, to a control technique reducing the number of rotations of an output shaft of the internal combustion engine at the time of gear shifting.

2. Description of the Background Art

Conventionally, a vehicle having manual transmission has been known, in which gear shifting is done manually while the clutch is disengaged by a driver operation on a clutch pedal. In such a vehicle, a shock comes when the clutch is engaged again after gear shifting, if the number of rotations of an output shaft of the engine does not match the number of rotations of an input shaft of the transmission. Therefore, a technique of attaining synchronization between the number of rotations of an output shaft of the engine and the number of rotations of an input shaft of the transmission at the time of gear shifting has been proposed.

Japanese Patent Laying-Open No. 2001-74135 discloses a transmission control device capable of suppressing generation of the shock experienced at the time of shift change, that is, the shift shock. The transmission control device described in Japanese Patent Laying-Open No. 2001-74135 includes, in a manual transmission vehicle including an engine and a manual transmission connected to the engine through a clutch, a transmission input shaft rotation number detecting unit for detecting the number of rotations of the input shaft of the manual transmission, on the input shaft side of the manual transmission, and a control unit controlling engine speed (number of rotations) of the engine such that it is synchronized with the number of rotations of the input shaft of manual transmission in accordance with a detection signal from the transmission input shaft rotation number detecting unit, regardless of an accelerator position, when the clutch is disengaged (released). The control unit determines an amount of control reflecting the difference between the number of rotations of the input shaft of the manual transmission and the engine speed at the time of an up-shifting from a preset map, and controls the engine speed based on the amount of control, so that the engine speed decreases. Further, when the difference between the number of rotations of the input shaft of the manual transmission and the engine speed is not larger than a prescribed value, the control unit determines an amount of control found from the preset map to be zero, so that engine speed control is not performed.

According to the transmission control device in accordance with this laid-open application, the control unit has a function of controlling the engine speed such that it is synchronized with the number of rotations of the input shaft of manual transmission in accordance with a detection signal from the transmission input shaft rotation number detecting unit, regardless of an accelerator position when the clutch is disengaged, and therefore, the shock at the time of shift change, that is, the shift shock, can be suppressed. Further, the control unit additionally has a function of determining the amount of control reflecting the difference between the number of rotations of the input shaft of the manual transmission and the engine speed at the time of an up-shifting from a preset map and controlling the engine speed based on the amount of control, so that the engine speed decreases. Therefore, even when the driver shifts the gear up (up-shift) while continuously pressing the acceleration pedal, the difference between the engine speed and the number of rotations of the input shaft of the manual transmission can automatically be absorbed, and efficient transmission control is possible. Further, the control unit additionally has a function of determining the amount of control found from a preset map to be zero, so as not to perform engine speed control. Therefore, engine speed control is not performed when the difference between the number of rotations of the input shaft of the manual transmission and the engine speed is not larger than a prescribed value, that is, when the vehicle is started from the stopped state, and therefore, a factor that may hinder the half-clutch starting operation can be avoided.

In an engine having inertia mass of a flywheel or intake volume enlarged in order to increase engine output, even when the accelerator is set to the full close position for an up-shift, sometimes the engine speed still continues to increase for a while. Therefore, if engine speed control is not performed when the difference between the number of rotations of the input shaft of the manual transmission and the engine speed is not larger than a prescribed value, as in the transmission control device described in the laid-open application mentioned above, the difference in the number of rotations would be considerably large by the time the clutch is re-engaged, even if the difference is small at the start of gear shifting. If the clutch is re-engaged in this state, a shift shock is likely.

SUMMARY OF THE INVENTION

An object of the present invention is to provide a controller for an internal combustion engine capable of suppressing a shift shock.

According to an aspect, the controller for an internal combustion engine controls an internal combustion engine coupled to a transmission through a friction engagement element transmitting a driving force. The controller includes a control unit controlling the internal combustion engine such that number of rotations of an output shaft of the internal combustion engine is reduced when an accelerator position is smaller than a predetermined open position and rate of increase in the number of rotations of the output shaft of the internal combustion engine is larger than a predetermined determination value.

According to the present invention, the internal combustion engine is controlled such that when the accelerator position is smaller than a predetermined position (for example, when it could be regarded as fully closed) and the rate of increase of the number of rotations of the output shaft of the internal engine is larger than a predetermined determination value, the number of rotations of the output shaft is reduced. Thus, at the time of gear shifting (particularly, up-shifting), the number of rotations of the output shaft of the internal combustion engine is prevented from attaining excessively high with respect to the number of rotations of the input shaft after gear shifting of the transmission. Consequently, when a friction engagement element, which has been released at the time of gear shifting, is re-engaged, shock generation can be suppressed. As a result, an internal combustion engine controller that can suppress a shift shock can be provided.

Preferably, the control unit controls the internal combustion engine such that the number of rotations of an output shaft of the internal combustion engine is reduced while the friction engagement element is engaged and the driving force is being transmitted from the internal combustion engine to the transmission.

According to the present invention, in a state in which the friction engagement element is engaged and the driving force is being transmitted from the internal combustion engine to the transmission, the internal combustion engine is controlled such that the number of rotations of the output shaft of the internal combustion engine is reduced. Thus, the rotation number of the output shaft can be reduced quickly before the disengagement of the friction engagement element, that is, before the start of gear shifting. Consequently, when the friction engagement element, which has been released at the time of gear shifting, is re-engaged, shock generation can be suppressed. As a result, a shift shock can be suppressed.

More preferably, the determination value is determined based on a gear ratio of the transmission and the number of rotations of the output shaft of the internal combustion engine.

According to the present invention, the determination value is determined based on the gear ratio of the transmission and on the number of rotations of the output shaft of the internal combustion engine. Therefore, an appropriate determination value that corresponds to the state of running of the vehicle at the time of gear shifting can be obtained. The determination value as such is compared with the rate of increase of the rotation number of output shaft of the internal combustion engine, and whether the control should be performed to reduce the rotation number of output shaft or not is determined. As a result, the internal combustion engine can be controlled appropriately in accordance with the state of running of the vehicle at the time of gear shifting, and a shift shock can be suppressed.

More preferably, the controller further includes a correcting unit correcting the determination value based on a degree of change of load factor of the internal combustion engine.

According to the present invention, the determination value is corrected based on the degree of change in load factor of the internal combustion engine. By way of example, the determination value is corrected to be larger as the degree of change in the load factor is larger. The reason for this is as follows. When the speed is accelerated rapidly, particularly with low gear (for example, first gear), the number of rotations of the output shaft of the internal combustion engine readily increases as the gear ratio is high, and hence, the rate of increase of the number of rotations of the output shaft of the internal combustion engine tends to be high after the acceleration pedal is fully closed. When the speed is decelerated rapidly, particularly with low gear, the number of rotations of the output shaft of the internal combustion engine readily decreases as the gear ratio is high, and the control tends to enter ISC (Idle Speed Control). When entering the ISC, the output of the internal combustion engine increases, and therefore, the rotation number of the output shaft, which has been decreased, starts to increase. Here, with high gear ratio, rotation number of the output shaft tends to increase at a high rate of increase. In such situations, if the internal combustion engine is controlled such that the rotation number of the output shaft becomes lower while the driver has no intension of gear shifting, the behavior of the internal combustion engine would be different from what the driver expects. Therefore, the determination value is corrected such that it becomes larger as the degree of change of load factor becomes larger. Specifically, when rapid acceleration or rapid deceleration with low gear seems to have occurred, the determination value is corrected to be larger. Therefore, the determination value can be set to a more appropriate value reflecting the state of running of the vehicle, and erroneous determination as to whether control should be done to reduce the rotation number of the output shaft or not can be suppressed.

Preferably, the correcting unit corrects the determination value to a larger value.

According to the present invention, the determination value is corrected to be larger. By way of example, the determination value is corrected to be larger as the degree of change in the load factor is larger. Specifically, when rapid acceleration or rapid deceleration with low gear seems to have occurred, the determination value is corrected to a larger and more appropriate value, and erroneous determination as to whether control should be done to reduce the rotation number of the output shaft or not can be suppressed.

More preferably, the correcting unit corrects the determination value such that amount of correction of the determination value decreases gradually.

According to the present invention, as rapid increase in the rotation number of the output shaft of internal combustion engine may intermittently continue when rapid acceleration or rapid deceleration with low gear occurs, the determination value is corrected such that the amount of correction to the determination value decreases gradually. Specifically, correction of the determination value is continued for a while so that the determination value becomes smaller with time. As a result, the determination value can be set to a more appropriate value, and erroneous determination as to whether control should be done to reduce the rotation number of the output shaft or not can be suppressed.

More preferably, the control unit controls the internal combustion engine such that the number of rotations of an output shaft of the internal combustion engine is reduced, by performing at least one of suspension of ignition in the internal combustion engine, suspension of fuel injection in the internal combustion engine and reduction of throttle opening in the internal combustion engine.

According to the present invention, by suspending ignition or suspending fuel injection in the internal combustion engine to stop burning in the cylinder, or by decreasing throttle opening position to enlarge pumping loss, the rotation number of the output shaft of internal combustion engine is reduced. Consequently, when the friction engagement element, which has been released at the time of gear shifting, is re-engaged, shock generation can be suppressed. As a result, a shift shock can be suppressed.

More preferably, the control unit controls the internal combustion engine such that the number of rotations of an output shaft of the internal combustion engine is reduced, by suspending ignition in the internal combustion engine and thereafter suspending fuel injection in the internal combustion engine.

According to the present invention, ignition in the internal combustion engine is suspended and, thereafter, fuel injection is suspended. The reason for this is as follows. In a direct injection engine in which fuel is directly injected to the cylinder, the fuel is injected in an intake stroke or a compression stroke, and then an air-fuel mixture is ignited. In other words, the timing of fuel injection is earlier than the timing of ignition. Therefore, the amount and timing of fuel injection are determined at an earlier stage than the ignition timing. Therefore, at the stage where it is determined to execute control to reduce the rotation number of the output shaft of internal combustion engine, the amount and timing of fuel injection could have been already determined and fuel injection cannot be suspended. Even in such a situation, it may be likely that the ignition timing is not yet determined and therefore ignition can be suspended. Therefore, when it is impossible to suspend fuel injection, ignition is suspended first to stop burning in the cylinder, and then, fuel injection is suspended, so that burning in the cylinder is reliably stopped. Thus, the number of rotations of the output shaft of internal combustion engine can be reduced rapidly. Consequently, when the friction engagement element, which has been released at the time of gear shifting, is re-engaged, shock generation can be suppressed. As a result, a shift shock can be suppressed.

More preferably, the control unit controls the internal combustion engine such that the number of rotations of an output shaft of the internal combustion engine is reduced, by retarding ignition timing in the internal combustion engine and thereafter, suspending fuel injection in the internal combustion engine.

According to the present invention, the ignition timing in the internal combustion engine is retarded and, thereafter, fuel injection is suspended. The reason for this is as follows. Particularly in a direct injection engine in which fuel is directly injected to the cylinder, the fuel is injected in an intake stroke or a compression stroke, and then an air-fuel mixture is ignited. In other words, the timing of fuel injection is earlier than the timing of ignition. Therefore, the amount and timing of fuel injection are determined at an earlier stage than the ignition timing. Therefore, at the stage where it is determined to execute control to reduce the rotation number of the output shaft of internal combustion engine, the amount and timing of fuel injection could have been already determined and fuel injection cannot be suspended. Even in such a situation, it may be likely that the ignition timing is not yet determined and therefore, it is often possible to retard the ignition timing. Accordingly, if it is impossible to suspend fuel injection, the ignition timing is retarded first to lower the output of the internal combustion engine, and thereafter, fuel injection is suspended to stop burning in the cylinder. Thus, the number of rotations of the output shaft of internal combustion engine can be reduced rapidly. Consequently, when the friction engagement element, which has been released at the time of gear shifting, is re-engaged, shock generation can be suppressed. As a result, a shift shock can be suppressed.

More preferably, the control unit controls the internal combustion engine such that the number of rotations of an output shaft of the internal combustion engine is reduced, by reducing opening of the throttle in the internal combustion engine and thereafter suspending at least one of ignition and fuel injection in the internal combustion engine.

According to the present invention, the throttle opening position is reduced first to enlarge pumping loss, and thereafter, at least one of ignition and fuel injection in the internal combustion engine is suspended to stop burning in the cylinder, whereby the internal combustion engine is controlled such that the number of rotations of the output shaft is reduced. Thus, the number of rotations of the output shaft of internal combustion engine can be reduced rapidly. Consequently, when the friction engagement element, which has been released at the time of gear shifting, is re-engaged, shock generation can be suppressed. As a result, a shift shock can be suppressed.

More preferably, the controller further includes: a throttle valve control unit controlling a throttle valve such that the throttle valve is opened in a state of operation in which the accelerator position is smaller than the predetermined open position, different from an idle state of the internal combustion engine; and an inhibiting unit inhibiting reduction of the number of rotations of the output shaft of the internal combustion engine by the control unit when the throttle valve is opened under the control of the throttle valve control unit.

According to the present invention, in a state of operation different from the idle state of the internal combustion engine, when the accelerator position is smaller than a predetermined opening position, control is done so that the throttle valve is opened. By way of example, under cruise control for steadily running the vehicle at a set speed or under VSC (Vehicle Stability Control), the throttle valve is controlled such that it is opened in a state of operation in which the accelerator position is fully closed, in response to a request to open the throttle valve. That the throttle valve is opened under such control means that driving force from the internal combustion engine is required to attain the desired state of running of the vehicle. Therefore, in that case, control of the internal combustion engine to reduce the rotation number of the output shaft is inhibited. Thus, unnecessary reduction of the number of rotations of output shaft can be suppressed, and the desired running state of the vehicle is attained.

According to another aspect, the present invention provides a controller for an internal combustion engine, including: a determining unit determining whether number of rotations of an output shaft of the internal combustion engine is to be reduced or not; and a control unit controlling the internal combustion engine such that, when it is determined that the number of rotations of the output shaft of the internal combustion engine is to be reduced, the number of rotations of an output shaft of the internal combustion engine is reduced by retarding ignition timing in the internal combustion engine and thereafter suspending fuel injection in the internal combustion engine.

According to the present invention, the timing of ignition by the internal combustion engine is retarded and, thereafter, fuel injection is suspended. The reason for this is as follows. Particularly in a direct injection engine in which fuel is directly injected to the cylinder, the fuel is injected in an intake stroke or a compression stroke, and then an air-fuel mixture is ignited. In other words, the timing of fuel injection is earlier than the timing of ignition. Therefore, the amount and timing of fuel injection are determined at an earlier stage than the ignition timing. Therefore, at the stage where it is determined to execute control to reduce the rotation number of the output shaft of internal combustion engine, the amount and timing of fuel injection could have been already determined and fuel injection cannot be suspended. Even in such a situation, it may be likely that the ignition timing is not yet determined and therefore, it is often possible to retard the ignition timing. Accordingly, if it is impossible to suspend fuel injection, the ignition timing is retarded first to lower the output of the internal combustion engine, and thereafter, fuel injection is suspended to stop burning in the cylinder. Therefore, when it is determined at the time of gear shifting (particularly at the time of up-shifting) to reduce the number of rotations of output shaft as the rate of increase in the number of rotations of output shaft of the internal combustion engine is high while the accelerator is at the full close position, the number of rotations of output shaft is reduced rapidly, suppressing excessive increase in the number of rotations of output shaft of the internal combustion engine with respect to the number of rotations of input shaft after gear shifting of the transmission. Thus, the number of rotations of the output shaft of internal combustion engine can be reduced rapidly. Consequently, when the friction engagement element, which has been released at the time of gear shifting, is re-engaged, shock generation can be suppressed. As a result, an internal combustion engine controller capable of suppressing a shift shock can be provided.

Preferably, the internal combustion engine is coupled to a transmission. The control unit controls the internal combustion engine such that the number of rotations of an output shaft of the internal combustion engine is reduced, by retarding ignition timing in the internal combustion engine and thereafter, suspending fuel injection in the internal combustion engine.

According to the present invention, at the time of gear shifting, the timing of ignition by the internal combustion engine is retarded and, thereafter, fuel injection is suspended. Therefore, when it is determined at the time of gear shifting (particularly at the time of up-shifting) to reduce the number of rotations of output shaft as the rate of increase in the number of rotations of output shaft of the internal combustion engine is high while the accelerator is at the full close position, the number of rotations of output shaft is reduced rapidly, suppressing excessive increase of the number of rotations of output shaft of the internal combustion engine with respect to the number of rotations of input shaft after gear shifting of the transmission. Thus, the number of rotations of the output shaft of internal combustion engine can be reduced rapidly. Consequently, when the friction engagement element, which has been released at the time of gear shifting, is re-engaged, shock generation can be suppressed. As a result, shift shock can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
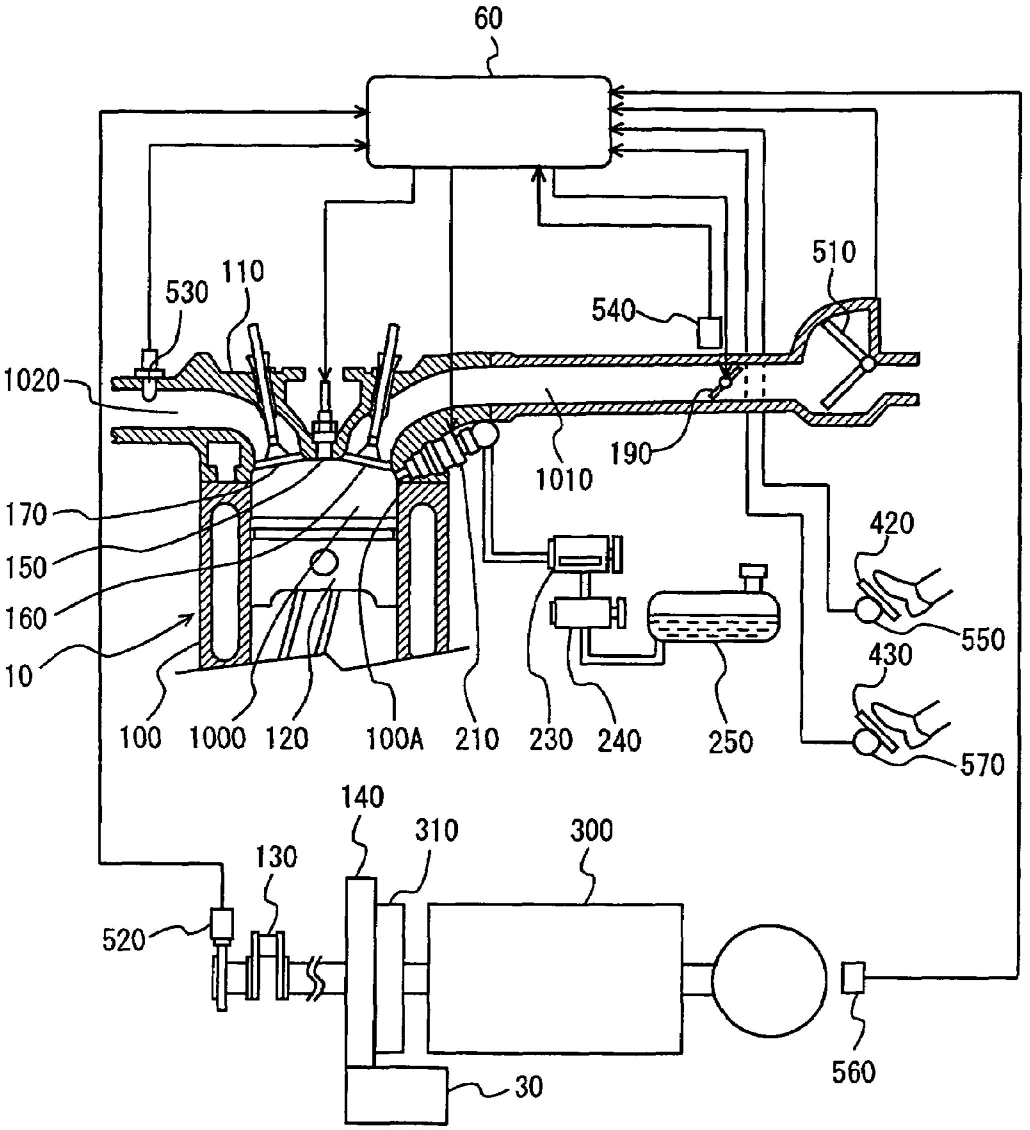
FIG. 1 shows an overall configuration of an engine controlled by a controller in accordance with an embodiment of the present invention.

In the following, an embodiment of the present invention will be described with reference to the figures. In the description below, the same components are denoted by the same reference characters. They have the same names and functions. Therefore, detailed description thereof will not be repeated.

FIG. 1 shows an overall configuration of a direct injection engine controlled by the controller in accordance with the present invention. An engine body 10 includes a cylinder block 100 covered at an upper portion with a cylinder head 110, and a piston 120 is slidably held in a cylinder 100A formed in cylinder block 100. Upward/downward reciprocal motion of piston 120 in cylinder 100A is translated to a rotational motion of a crank shaft 130, and transmitted to a transmission 300 and the like. At the start of engine operation, crank shaft 130 is connected through a flywheel 140 to a starter 30. Between flywheel 140 and transmission 300, a clutch 310 is provided.

In the present embodiment, transmission 300 is a manual transmission shifted by a manual operation by the driver. Clutch 310 is engaged/disengaged by an operation by the driver.

Above piston 120, a combustion chamber 1000 is formed, with cylinder 100 and cylinder head 110 serving as chamber walls. In combustion chamber 1000, an air-fuel mixture is burned, and the explosive force of combustion causes upward/downward reciprocal motion of piston 120. Ignition of the air-fuel mixture is done by a spark plug 150 provided through cylinder head 110 and protruding to combustion chamber 1000.

The air of the air-fuel mixture is supplied through cylinder head 110 and an intake manifold 1010 formed in an intake pipe connected to the head. Combustion chamber 1000 is exhausted through an exhaust manifold 1020. On cylinder head 110, an intake valve 160 opening/closing communication between intake manifold 1010 and combustion chamber 1000 and an exhaust valve 170 opening/closing communication between exhaust manifold 1020 and combustion chamber 1000 are attached.

In the intake manifold, a flap-type throttle valve 190 is provided, and the airflow in intake manifold 1010 is adjusted in accordance with the open position of the valve.

The fuel of air-fuel mixture is supplied by an electromagnetic injector 210. Injector 210 is provided through cylinder head 110, and injects fuel from a nozzle portion at a tip end into combustion chamber 1000 (cylinder). In place of, or in addition to injector 210, an injector injecting fuel in an intake port or in intake manifold 1010 may be provided.

As for the fuel supply to injector 210, the fuel suctioned from a fuel tank 250 is pressurized in two stages by a low-pressure pump 240 and a high-pressure pump 230, and then supplied to the injector. High-pressure pump 230 is driven by a force transmitted from crank shaft 130 of engine body 10 through a belt or the like. Low-pressure pump 240 is electrically powered, and at the start of operation, the fuel is supplied from low-pressure pump 240 to injector 210.

Further, an engine control computer (hereinafter referred to as an engine ECU (Electronic Control Unit) 60 is provided for controlling various portions of the engine, including spark plug 150, throttle valve 190 and injector 210. Engine ECU 60 has a general structure including a CPU (Central Processing Unit), an RAM (Random Access Memory), an SRAM (Static Random Access Memory), an ROM (Read Only Memory) and the like, and based on detection signals and the like from various sensors, causes an operation of spark plug 150, adjusts open position (throttle open position) of throttle valve 190 by outputting a control signal to throttle valve 190, and opens the nozzle of injector 210 at a prescribed timing for a prescribed time period, by applying power to injector 210 in accordance with a control signal.

Engine ECU 60 receives inputs from sensors including an air flow meter 510, a crank angle sensor 520, an A/F sensor 530, a throttle opening position sensor 540, an accelerator position sensor 550, a vehicle speed sensor 560, and a cooling water temperature sensor.

Air flow meter 510 measures flow rate of air flowing through intake manifold 1010. Crank angle sensor 520 outputs a pulse signal for detecting engine speed NE. A/F sensor 530 measures air-fuel ratio in exhaust manifold 1020. Throttle open position sensor 540 detects open position of throttle valve 190. Accelerator position sensor 550 detects open position (degree of pressing) of accelerator pedal 420.

Vehicle speed sensor 560 outputs pulse signals for detecting vehicle speed (wheel rotation). Cooling water temperature sensor detects the temperature of engine cooling water, representing the engine temperature.

Further, when the driver operates a key at the start of operation, an ignition (IG) ON signal and a starter ON signal are input to engine ECU 60. When clutch pedal stroke attains to the maximum, a neutral start switch 570 is turned on, and an ON signal is input to engine ECU 60.

Engine ECU 60 controls the amount of fuel injection based on the amount of intake air detected by air flow meter 510 and the like. AT this time, engine ECU 60 adjusts the amount and timing of injection in accordance with the engine speed and the engine load, to attain the optimal state of combustion, based on the signals from various sensors. In engine body 10, the fuel is directly injected to the cylinder, and therefore, the injection timing and injection amount are controlled simultaneously. Further, in engine ECU 60, ignition timing is controlled so that ignition is done at an optimal timing, based on signals detected by crank angle sensor 520, a cam position sensor or the like (including a knock sensor). Such control realizes higher output and lower emission of engine body 10.

Figure 2:
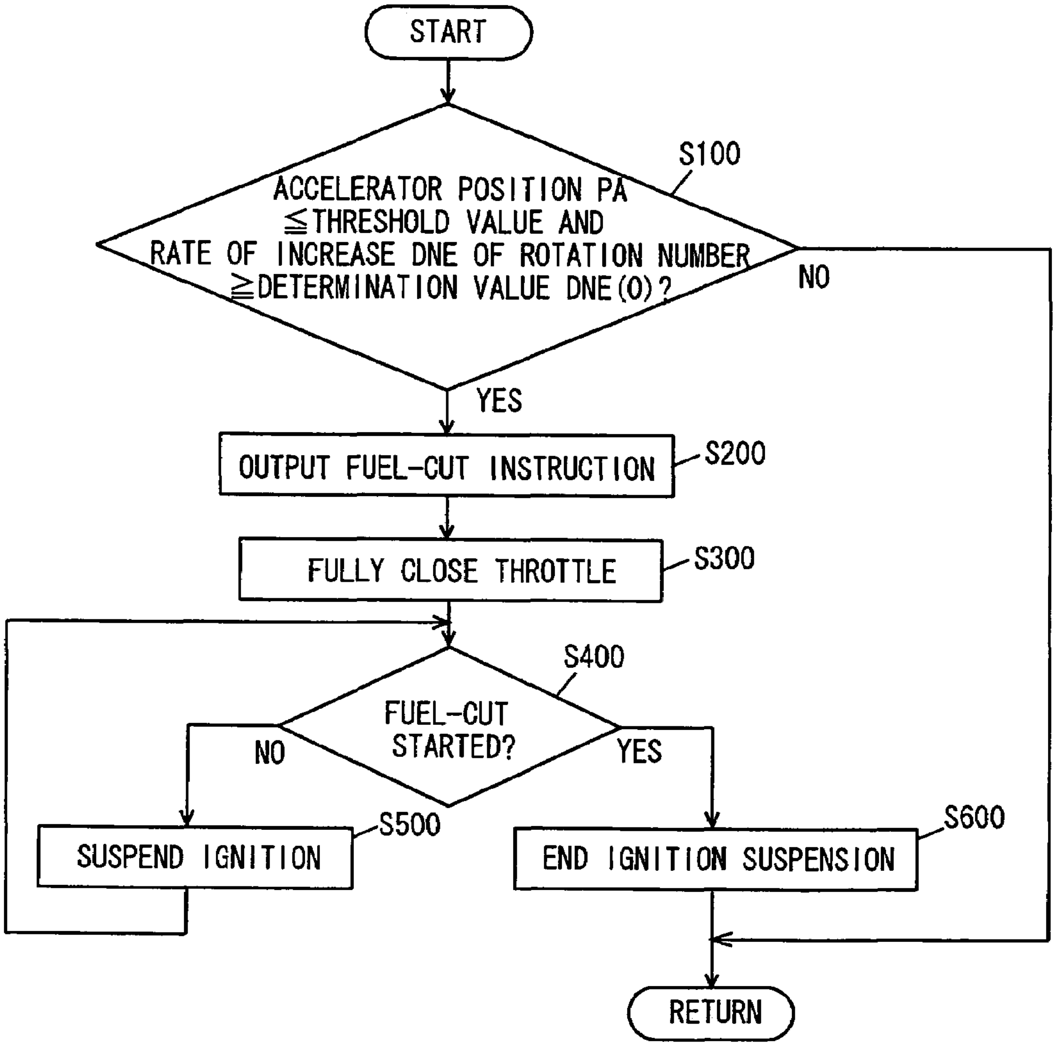
FIG. 2 is a flowchart (part 1) representing a control structure of a program executed by an engine ECU as a controller in accordance with the embodiment of the present invention.

Referring to FIG. 2, a control structure of a program executed by engine ECU 60 as a controller in accordance with the present embodiment will be described. The program described in the following is executed repeatedly in a predetermined period.

At step (hereinafter simply denoted by S) 100, engine ECU 60 determines whether the conditions that accelerator position PA is not higher than a threshold value and the rate of increase DNE of engine speed NE is not lower than the determination value DNE(0) are satisfied or not. Here, the threshold value of accelerator position PA is, for example, "0°". Determination value DNE(0) is calculated in a determination value calculating routine, which will be described later. At S100, whether the engine speed NE should be reduced or not (torque down should be done or not) is determined.

When the conditions that accelerator position PA is not higher than the threshold value and the rate of increase DNE of engine speed NE is not lower than the determination value DNE(0) are satisfied (YES at S100), it is determined that the engine speed NE should be reduced (there is a torque down request), and the process proceeds to S200. Otherwise (NO at S100), this process ends.

At S200, engine ECU 60 outputs a fuel-cut (suspending fuel injection) instruction. At S300, engine ECU 60 sets the throttle to a fully closed position.

At S400, engine ECU 60 determines whether fuel-cut started or not. Whether fuel-cut has started or not may be determined based on the air-fuel ratio detected, for example, by A/F sensor 530. When fuel-cut has started (YES at S400), the process proceeds to S600. Otherwise (NO at S400), the process proceeds to S500.

At S500, engine ECU 60 suspends ignition of air-fuel mixture by spark plug 150. At S600, engine ECU 60 terminates suspension of ignition of the air-fuel mixture by spark plug 150. When ignition of air-fuel mixture by spark plug 150 has not been suspended, ignition is continued.

Figure 3:
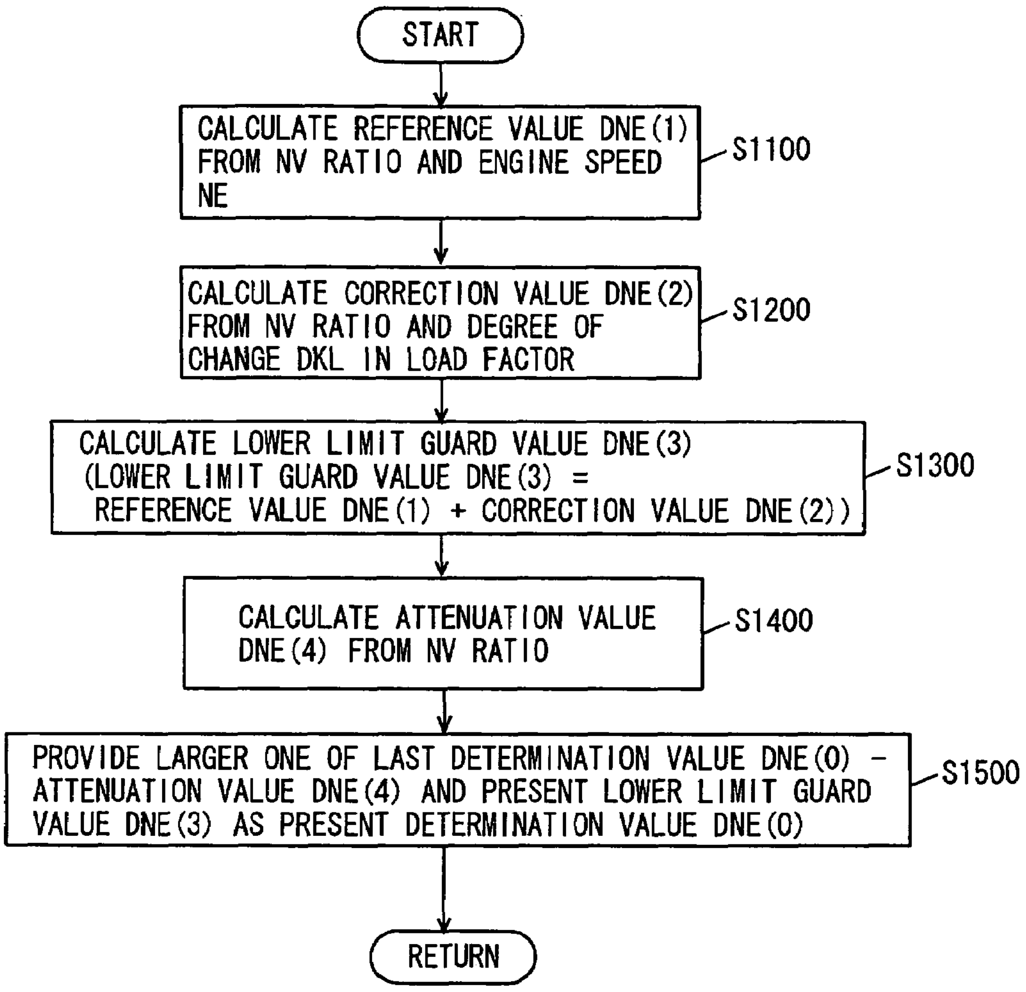
FIG. 3 is a flowchart (part 2) representing a control structure of a program executed by an engine ECU as a controller in accordance with the embodiment of the present invention.
Figure 4:
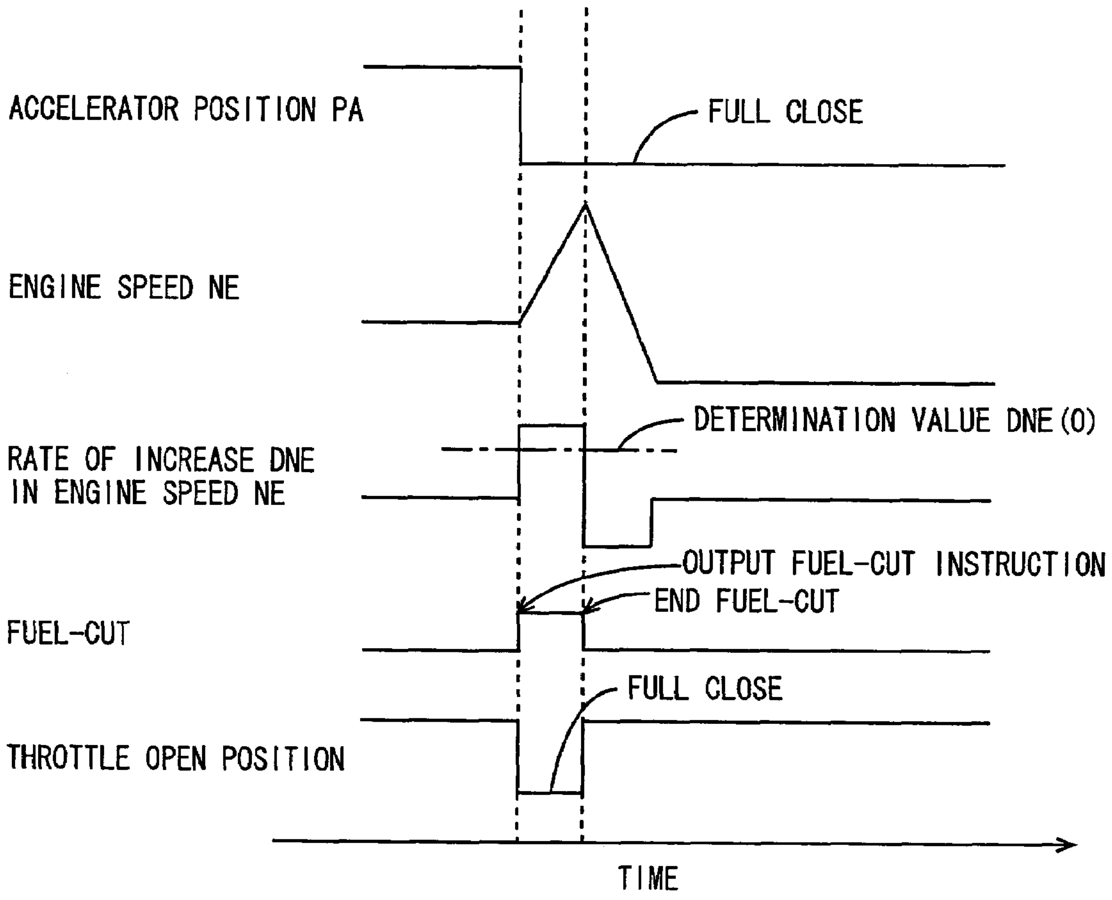
FIG. 4 is a timing chart representing a timing of executing a fuel-cut.

Referring to FIG. 3, a control structure of a program for the determination value calculating routine executed for calculating the determination value DNE(0) will be described. The program described in the following is executed repeatedly in a predetermined period.

At S1100, engine ECU 60 calculates a reference value DNE(1), based on an NV ratio (engine speed/vehicle speed) and on the engine speed. The reference value DNE(1) is calculated by using a map formed in advance based on experimental results. The NV ratio is used, in order to calculate the reference value DNE(1) based on the gear ratio, that is, the gear stage.

At S1200, engine ECU 60 calculates a correction value DNE(2), based on the NV ratio and the degree of change (rate of change) of engine load factor DKL. The correction value DNE(2) is calculated by using a map formed in advance based on experimental results. By way of example, when the degree of change of the engine load factor is larger, a larger correction value DNE(2) is provided.

At S1300, engine ECU 60 calculates a lower limit guard value DNE(3) of determination value DNE(0). The lower limit guard value DNE(3) is calculated as a sum of reference value DNE(1) and correction value DNE(2).

At S1400, engine ECU 60 calculates an attenuation value DNE(4) of determination value DNE(0) based on the NV ratio. Attenuation value DNE(4) is calculated by using a map formed in advance based on experimental results.

At S1500, engine ECU 60 provides as the present determination value DNE(0), the larger one of the presently calculated lower limit guard value DNE(3) and a value obtained by subtracting the presently calculated attenuation value DNE (4) from the last calculated determination value DNE(0).

An operation of engine ECU 60 as the controller in accordance with the present embodiment, based on the structure and flowcharts above, will be described in the following.

When accelerator position is not higher than the threshold value and it can be regarded as fully closed, it follows that the driver intends to lower the engine speed NE by easing up the accelerator pedal 420, for a gear shifting (particularly, up-shifting).

In an engine having large inertia mass of a flywheel 140 or large intake volume, even when the accelerator pedal is released, sometimes the engine speed NE still continues to increase for a while. Engine speed NE increases after accelerator position fully closed. When up-shifting is done in this state, even if the difference between the engine speed NE and the number of rotations NIN of input shaft of transmission 300 is small at the start of gear shifting, the difference in the number of rotations would be large at the time of re-engagement of clutch 310 after gear shifting, possibly causing a shift shock.

Therefore, in order to reduce engine speed NE quickly, when the conditions that accelerator position PA is not higher than a threshold value and the rate of increase DNE of engine speed NE is not lower than the determination value DNE(0) are satisfied (YES at S100), a fuel-cut instruction is output (S200).

When a fuel-cut is executed, combustion of air-fuel mixture in the cylinder is stopped, and therefore, the engine speed NE can quickly be reduced. Further, the throttle open position is set to full close position (S300) and pumping loss is increased, whereby the engine speed NE can be reduced even more quickly.

In a direct injection engine including an injector that directly injects fuel to the cylinder, the fuel is injected in the intake stroke or compression stroke. Therefore, the amount and timing of injection must be determined, at least 360° BTDC (Before Top Dead Center).

Therefore, for the cylinder of which amount and timing of fuel injection have already been determined at the time when the fuel-cut instruction is output, the fuel-cut cannot be executed in that cycle even if the fuel-cut instruction is output.

Figure 5:
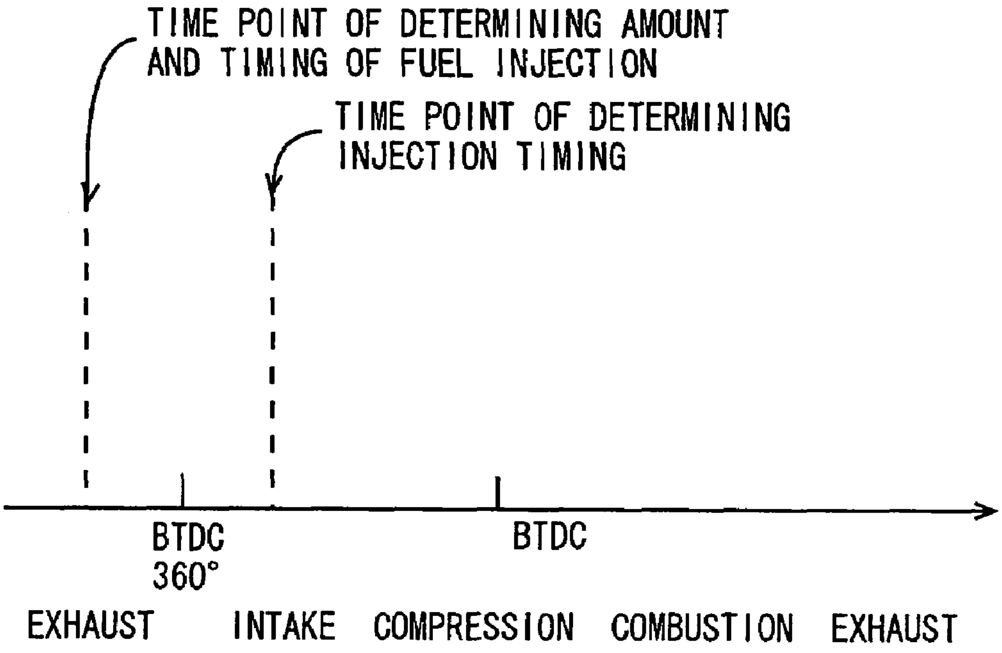
FIG. 5 is a timing chart representing a relation between the time point of determining amount and timing of fuel injection and the time point of determining ignition timing.

On the contrary, ignition of the air-fuel mixture is performed after fuel injection. Specifically, the fuel injection timing is earlier than the ignition timing. Therefore, the ignition timing is determined in a later stage than the determination of fuel amount and fuel injection timing, as shown in FIG. 5. If fuel-cut instruction is given in the period between time point of determining amount and timing of fuel injection and time point of determining ignition timing, fuel-cut is impossible while ignition can be suspended. Therefore, even if the mount and timing of fuel injection have already been determined when the fuel-cut instruction is output, it is often the case that the ignition timing is not yet determined and hence it is possible to suspend ignition.

Therefore, when the air-fuel ratio does not become leaner than the theoretical air-fuel ratio and the fuel-cut does not seem to be effected (NO at S400) even after the output of fuel-cut instruction (S200), ignition of air-fuel mixture by spark plug 150 is suspended (S500). Consequently, combustion in the cylinder is stopped, and the engine speed NE can quickly be reduced.

Thereafter, when fuel-cut starts (YES at S400) in the cylinder in which the amount and timing of fuel injection had not been determined at the time the fuel-cut instruction was output (S200), suspension of ignition to the air-fuel mixture by spark plug 150 is terminated (S600).

In this manner, the engine speed NE is quickly reduced at the time of gear shifting, and the difference between the engine speed NE and the number of rotations NIN of the input shaft of transmission 300 is made smaller, whereby a shift shock can be suppressed.

In the present embodiment, dependent on the accelerator position PA and the rate of increase DNE in engine speed NE, whether the fuel-cut is to be executed or not is determined. Therefore, the fuel-cut, suspension of ignition and full-closure of throttle open position to reduce the engine speed NE are all possible also in the state where clutch 310 is engaged and driving force is being transmitted from the engine to transmission 300. Therefore, the engine speed NE can quickly be reduced before the clutch 310 is actually released and gear shifting starts.

It is noted that the reaction force on the engine differs dependent on the gear ratio. Therefore, it follows that the rate of increase DNE of engine speed NE depends on the gear ratio. Further, because of engine characteristics, the engine output varies as the engine speed NE varies. Accordingly, the rate of increase DNE of engine speed NE also depends on the engine speed NE.

Therefore, when the determination value DNE(0) is calculated, the reference value DNE(1) for the determination value DNE(0) is calculated based on the engine speed NE and the NV ratio for obtaining the gear ratio (S1100). Thus, an appropriate determination value in accordance with the state of running of the vehicle can be obtained.

Figure 6:
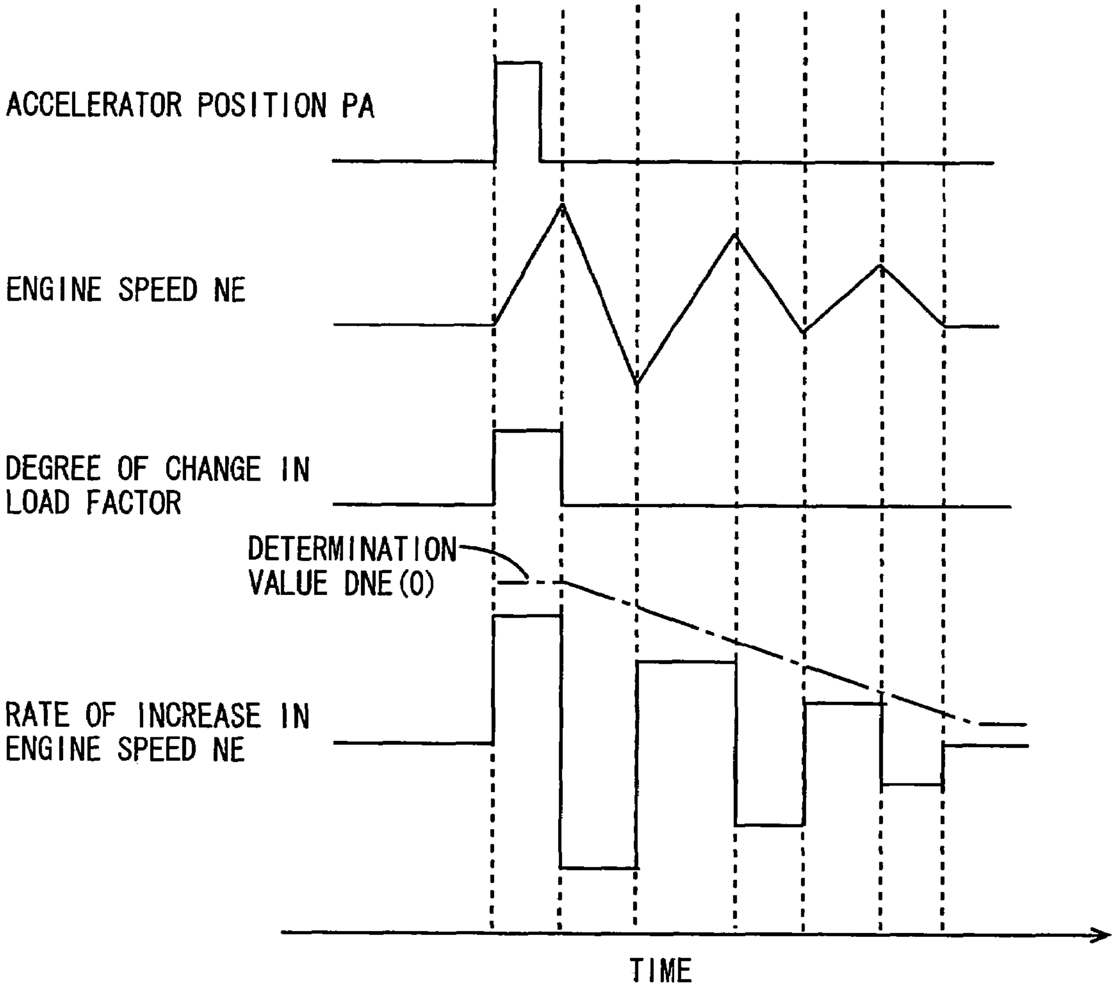
FIG. 6 is a timing chart representing behavior of engine speed NE, when the speed is rapidly accelerated or decelerated with low gear.

If the speed is rapidly increased during running particularly with low gear (for example, first gear), acceleration is readily attained as the gear ratio is high, and as a result, the engine speed NE readily increases, as shown in FIG. 6. Therefore, the rate of increase in engine speed NE tends to be high.

Further, if the speed is rapidly reduced during running particularly with low gear, engine speed NE readily reduces as the gear ratio is high, and the control tends to enter ISC. Entering the ISC control, the engine output may be temporarily increased, and hence, the engine speed NE, which has been lowered, comes to increase. At this time, the rate of increase in engine speed NE tends to be high, as the gear ratio is high.

In such situations, if the engine speed NE is made lower while the driver does not have any intention of gear shifting, the behavior of the engine would be different from what the driver expects.

In view of the foregoing, when rapid acceleration or rapid deceleration seems to have taken place with low gear, a larger determination value DNE(0) is calculated and, in order to avoid an erroneous determination, a correction value DNE(2) is calculated based on the NV ratio and the degree of change DKL in engine load factor (S1200). The value obtained by adding the correction value DNE(2) to the reference value DNE(1) is calculated as the lower limit guard value DNE(3) of the determination value DNE(0) (S1300).

Specifically, the determination value DNE(0) is calculated to be not lower than the lower limit guard value DNE(3), which is higher by the correction value DNE(2) than the reference value DNE(1). Consequently, in accordance with the state of running of the vehicle, the determination value DNE(0) may be increased to an appropriate value. Thus, erroneous determination as to whether control should be done to reduce engine speed NE or not can be suppressed.

Here, the increase in engine speed NE derived from rapid acceleration or rapid deceleration with low gear does not quickly converge, and may occur intermittently as shown in FIG. 6. Specifically, the engine speed NE repeatedly increases and decreases.

At this time, the lower limit guard value DNE(3) is calculated repeatedly in a predetermined period. Therefore, even when the lower limit guard value DNE(3) is calculated while the engine speed NE is high resulting in a large determination value DNE(0), the lower limit guard value DNE(3) may be calculated again with the engine speed NE changed. Here, it is possible that re-calculation provides a small lower limit guard value DNE(3). When the determination value DNE(0) is calculated using the small lower limit guard value DNE(3), the resulting determination value DNE(0) may not be appropriate.

On the other hand, as shown in FIG. 6, the rate of increase DNE of engine speed NE tends to attenuate with time. Therefore, continuous use of lower limit guard value DNE(3) calculated at the start is pointless.

Therefore, in order to moderately attenuate (to gradually reduce) the obtained determination value DNE(0), an attenuation value DNE(4) of determination value DNE(0) is calculated based on the NV ratio (S1400). Of the value obtained by subtracting the attenuation value DNE(4) from the last calculated determination value DNE(0) and the lower limit guard value DNE(3) calculated this time, the larger one is given as the determination value DNE(0) of this time (S1500).

Specifically, as a large lower limit guard value DNE(3) is once calculated, even when a large determination value DNE (0) is calculated and then a small lower limit guard value DNE(3) is calculated, as long as the value obtained by subtracting the attenuation value DNE(4) from the determination value DNE(0) is not smaller than the newly calculated lower limit guard value DNE(3), the calculated determination value DNE(0) attenuates moderately (decreases gradually), as the attenuation value DNE(4) is subtracted periodically. Therefore, an appropriate determination value DNE(0) in accordance with the behavior of the vehicle can be obtained. Thus, erroneous determination as to whether control should be done to reduce engine speed NE or not can be suppressed.

On the contrary, when the newly calculated lower limit guard value DNE(3) becomes larger than the value obtained by subtracting the attenuation value DNE(4) from the determination value DNE(0), the lower limit guard value DNE(3) is provided as the determination value DNE(0), so that a large determination value DNE(0) is obtained. As a result, it becomes possible to increase the determination value DNE (0) to an appropriate value, in accordance with the state of running of the vehicle. Thus, erroneous determination as to whether control should be done to reduce engine speed NE or not can be suppressed.

As described above, by the engine ECU in accordance with the present embodiment, when the accelerator position PA is not higher than the threshold value and the rate of increase DNE of engine speed NE is lager than the determination value DNE(0), a fuel-cut is executed, ignition of air-fuel mixture is suspended, or the throttle open position is set to the full close position. By the fuel-cut or ignition suspension, combustion of air-fuel mixture is stopped. When the throttle opening is fully closed, pumping loss increases. Thus, engine speed NE decreases. Therefore, when the clutch, which has been disengaged at the time of gear shifting, is re-engaged, difference between the engine speed NE and the number of rotations NIN of input shaft of transmission 300 can be made small, and a shift shock can be suppressed.

When a neutral start switch 570 is on, it means that the clutch 310 is disengaged and clutch 310 must be re-engaged later. Therefore, the engine may be controlled such that the engine speed NE decreases regardless of the accelerator position PA or the rate of increase DNE of engine speed NE.

Further, when the vehicle is controlled such that throttle valve 190 is opened in a state of running in which the accelerator is at the full close position, in response to an open request of throttle valve by VSC control, or cruise control for steadily running the vehicle at a set speed, the driving force from the engine is required to attain the desired running state of the vehicle. In such a case, the control for decreasing engine speed NE (fuel-cut, ignition suspension, full closure of throttle) may be inhibited.

Further, for a cylinder of which amount and timing of fuel injection have already been determined at the time a fuel-cut instruction is output, the ignition timing may be retarded, in place of suspending ignition of air-fuel mixture by spark plug 150. When the ignition timing is retarded, the engine output decreases, and the engine speed NE can quickly be reduced. Here, the air-fuel mixture burns, and therefore, insufficient combustion of fuel can be suppressed. Therefore, by retarding the ignition timing, the engine speed can quickly be reduced while satisfactory exhaust emission performance is maintained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A controller for an internal combustion engine coupled to a transmission through a friction engagement element transmitting a driving force, comprising a control unit controlling said internal combustion engine such that number of rotations of an output shaft of said internal combustion engine is reduced when an accelerator position is smaller than a predetermined open position and rate of increase in the number of rotations of the output shaft of said internal combustion engine is larger than a predetermined determination value.

2. The internal combustion engine controller according to claim 1, wherein said control unit controls said internal combustion engine such that the number of rotations of the output shaft of said internal combustion engine is reduced while said friction engagement element is engaged and the driving force is being transmitted from said internal combustion engine to said transmission.

3. The internal combustion engine controller according to claim 1, wherein said determination value is determined based on a gear ratio of said transmission and the number of rotations of the output shaft of said internal combustion engine.

4. The internal combustion engine controller according to claim 1, further comprising a correcting unit correcting said determination value based on a degree of change of load factor of said internal combustion engine.

5. The internal combustion engine controller according to claim 4, wherein said correcting unit corrects said determination value to a larger value.

6. The internal combustion engine controller according to claim 4, wherein said correcting unit corrects said determination value such that amount of correction of said determination value decreases gradually.

7. The internal combustion engine controller according to claim 1, wherein said control unit controls said internal combustion engine such that the number of rotations of the output shaft of said internal combustion engine is reduced, by performing at least one of suspension of ignition in said internal combustion engine, suspension of fuel injection in said internal combustion engine and reduction of throttle opening in said internal combustion engine.

8. The internal combustion engine controller according to claim 1, wherein said control unit controls said internal combustion engine such that the number of rotations of the output shaft of said internal combustion engine is reduced, by suspending ignition in said internal combustion engine and thereafter suspending fuel injection in said internal combustion engine.

9. The internal combustion engine controller according to claim 1, wherein said control unit controls said internal combustion engine such that the number of rotations of the output shaft of said internal combustion engine is reduced, by retarding ignition timing in said internal combustion engine and thereafter suspending fuel injection in said internal combustion engine.

10. The internal combustion engine controller according to claim 1, wherein said control unit controls said internal combustion engine such that the number of rotations of the output shaft of said internal combustion engine is reduced, by reducing opening of said throttle in said internal combustion engine and thereafter suspending at least one of ignition and fuel injection in said internal combustion engine.

11. The internal combustion engine controller according to claim 1, further comprising:

a throttle valve control unit controlling a throttle valve such that the throttle valve is opened in a state of operation, in which the accelerator position is smaller than said predetermined open position, different from an idle state of said internal combustion engine; and an inhibiting unit inhibiting reduction of the number of rotations of the output shaft of said internal combustion engine by said control unit when said throttle valve is opened under the control of said throttle valve control unit.

12. A controller for an internal combustion engine, comprising:

a determining unit determining whether number of rotations of an output shaft of the internal combustion engine is to be reduced or not; and a control unit controlling said internal combustion engine such that, when it is determined that the number of rotations of the output shaft of said internal combustion engine is to be reduced, the number of rotations of an output shaft of said internal combustion engine is reduced by retarding ignition timing in said internal combustion engine and thereafter suspending fuel injection in said internal combustion engine.

13. The internal combustion engine controller according to claim 12, wherein said internal combustion engine is coupled to a transmission; and said control unit controls said internal combustion engine such that the number of rotations of the output shaft of said internal combustion engine is reduced, by retarding ignition timing in said internal combustion engine and thereafter suspending fuel injection in said internal combustion engine.

14. A controller for an internal combustion engine coupled to a transmission through a friction engagement element transmitting a driving force, comprising control means for controlling said internal combustion engine such that number of rotations of an output shaft of said internal combustion engine is reduced when an accelerator position is smaller than a predetermined open position and rate of increase in the number of rotations of the output shaft of said internal combustion engine is larger than a predetermined determination value.

15. The internal combustion engine controller according to claim 14, wherein said control means includes means for controlling said internal combustion engine such that the number of rotations of the output shaft of said internal combustion engine is reduced while said friction engagement element is engaged and the driving force is being transmitted from said internal combustion engine to said transmission.

16. The internal combustion engine controller according to claim 14, wherein said determination value is determined based on a gear ratio of said transmission and the number of rotations of the output shaft of said internal combustion engine.

17. The internal combustion engine controller according to claim 14, further comprising correcting means for correcting said determination value based on a degree of change of load factor of said internal combustion engine.

18. The internal combustion engine controller according to claim 17, wherein said correcting means includes means for correcting said determination value to a larger value.

19. The internal combustion engine controller according to claim 17, wherein said correcting means includes means for correcting said determination value such that amount of correction of said determination value decreases gradually.

20. The internal combustion engine controller according to claim 14, wherein said control means includes means for controlling said internal combustion engine such that the number of rotations of the output shaft of said internal combustion engine is reduced, by performing at least one of suspension of ignition in said internal combustion engine, suspension of fuel injection in said internal combustion engine and reduction of throttle opening in said internal combustion engine.

21. The internal combustion engine controller according to claim 14, wherein said control means includes means for controlling said internal combustion engine such that the number of rotations of the output shaft of said internal combustion engine is reduced, by suspending ignition in said internal combustion engine and thereafter suspending fuel injection in said internal combustion engine.

22. The internal combustion engine controller according to claim 14, wherein said control means includes means for controlling said internal combustion engine such that the number of rotations of the output shaft of said internal combustion engine is reduced, by retarding ignition timing in said internal combustion engine and thereafter suspending fuel injection in said internal combustion engine.

23. The internal combustion engine controller according to claim 14, wherein said control means includes means for controlling said internal combustion engine such that the number of rotations of an output shaft of said internal combustion engine is reduced, by reducing opening of said throttle in said internal combustion engine and thereafter suspending at least one of ignition and fuel injection in said internal combustion engine.

24. The internal combustion engine controller according to claim 14, further comprising:

throttle valve control means for controlling a throttle valve such that the throttle valve is opened in a state of operation, in which the accelerator position is smaller than said predetermined open position, different from an idle state of said internal combustion engine; and inhibiting means for inhibiting reduction of the number of rotations of the output shaft of said internal combustion engine by said control means when said throttle valve is opened under the control of said throttle valve control means.

25. A controller for an internal combustion engine, comprising:

determining means for determining whether number of rotations of an output shaft of the internal combustion engine is to be reduced or not; and control means for controlling said internal combustion engine such that, when it is determined that the number of rotations of the output shaft of said internal combustion engine is to be reduced, the number of rotations of an output shaft of said internal combustion engine is reduced by retarding ignition timing in said internal combustion engine and thereafter suspending fuel injection in said internal combustion engine.

26. The internal combustion engine controller according to claim 25, wherein said internal combustion engine is coupled to a transmission; and said control means includes means for controlling said internal combustion engine such that the number of rotations of an output shaft of said internal combustion engine is reduced, by retarding ignition timing in said internal combustion engine and thereafter suspending fuel injection in said internal combustion engine.

27. A controller for an internal combustion engine coupled to a transmission through a friction engagement element transmitting a driving force, comprising an ECU, wherein said ECU controls said internal combustion engine such that number of rotations of an output shaft of said internal combustion engine is reduced when an accelerator position is smaller than a predetermined open position and rate of increase in the number of rotations of the output shaft of said internal combustion engine is larger than a predetermined determination value.

28. A controller for an internal combustion engine, comprising an ECU, wherein said ECU determines whether number of rotations of an output shaft of the internal combustion engine is to be reduced or not, and controls said internal combustion engine such that, when it is determined that the number of rotations of the output shaft of said internal combustion engine is to be reduced, the number of rotations of an output shaft of said internal combustion engine is reduced by retarding ignition timing in said internal combustion engine and thereafter suspending fuel injection in said internal combustion engine.

* * * * *